United States Patent
Poole et al.

(10) Patent No.: US 10,788,174 B2
(45) Date of Patent: Sep. 29, 2020

(54) METHOD OF PRODUCING A DYNAMIC SINGLE DIMENSIONAL IMAGE FROM A TWO DIMENSIONAL IMAGE

(71) Applicants: Wayne Gerard Poole, Alexandria, VA (US); Svoboda J. Stephen, Fairfax, VA (US)

(72) Inventors: Wayne Gerard Poole, Alexandria, VA (US); Svoboda J. Stephen, Fairfax, VA (US)

(*) Notice: Subject to any disclaimer, the term of this patent is extended or adjusted under 35 U.S.C. 154(b) by 185 days.

(21) Appl. No.: 15/998,077

(22) Filed: Jun. 26, 2018

(65) Prior Publication Data

US 2019/0003663 A1  Jan. 3, 2019

Related U.S. Application Data

(60) Provisional application No. 62/604,266, filed on Jun. 30, 2017.

(51) Int. Cl.

| | |
|---|---|
| *F21S 4/20* | (2016.01) |
| *H04M 1/02* | (2006.01) |
| *H04N 5/232* | (2006.01) |
| *H04M 1/725* | (2006.01) |
| *H05B 47/19* | (2020.01) |
| *H05B 47/155* | (2020.01) |

(52) U.S. Cl.
CPC ............. *F21S 4/20* (2016.01); *H04M 1/0264* (2013.01); *H04M 1/7253* (2013.01); *H04N 5/23229* (2013.01); *H05B 47/155* (2020.01); *H05B 47/19* (2020.01); *H04M 2250/52* (2013.01)

(58) Field of Classification Search
CPC ......... F21S 4/20; H05B 47/19; H05B 47/155; H04M 1/0264; H04M 1/7253; H04N 5/23229
See application file for complete search history.

(56) References Cited

U.S. PATENT DOCUMENTS

| | | | |
|---|---|---|---|
| 2010/0254692 A1* | 10/2010 | Kurt ...................... | G03B 15/03 396/155 |
| 2017/0251538 A1* | 8/2017 | Green ..................... | G06T 7/74 |
| 2018/0279446 A1* | 9/2018 | Van De Sluis ...... | H05B 47/155 |
| 2018/0295699 A1* | 10/2018 | Franciosa ............. | H05B 45/00 |

* cited by examiner

*Primary Examiner* — Leon Flores

(57) ABSTRACT

A method producing a dynamic single dimensional output image from a two dimensional image is disclosed. A camera captures a digital image. In the method, each row of pixels of the input image may be read progressively to generate lighting instructions corresponding to each row. The instructions are sent to e.g. programmable LEDs. The process continues with a first row of pixels from the input image being processed first, followed by processing of a subsequent row of pixels of the input image. Upon processing of the second row of pixels, LEDs of the LED strip are illuminated correspondingly. This process continues iteratively until the final row of pixels of the input image. If the imaged object varies visually from one side to another or from top down, the LEDs illuminated by processing of each row of pixels will vary, thereby generating a dynamic image.

9 Claims, 2 Drawing Sheets

METHOD OF PRODUCING A DYNAMIC SINGLE DIMENSIONAL IMAGE FROM A TWO DIMENSIONAL IMAGE

REFERENCE TO RELATED APPLICATION

This application claims priority to U.S. Provisional Application Ser. No. 62/604,266, filed Jun. 20, 2017, contents of which are incorporated herein by this reference.

FIELD OF THE INVENTION

The present invention relates to generating images reproducible on lighting displays, and more particularly, to a method of generating a dynamic single dimensional output image which can be reproduced on a series of pixels or individual lighting elements.

BACKGROUND

Development of inexpensive series lighting apparatus, such as strips of material bearing light emitting diodes (LEDs) greatly expands the ability of the general public to create lighting displays for many purposes. For example, a strip of LEDs may be used to trace solid objects or otherwise be disposed on solid objects. These objects may then be provided with lighting effects generated by selectively illuminating individual LEDs on the strip or strips. While such lighting effects may be static, as occurs with most lights used for Christmas, it is possible to make lighting effects dynamic. For example, blinking Christmas lights are known.

However, it is possible to go well beyond mere blinking. Lights can be selectively illuminated to generate an effect of motion, wherein a cluster of illuminated LEDs seem to migrate along the strip of LEDs. Such lighting patterns may be the product of the manufacturer of the strip of LEDs. In other cases, consumers and others may desire to create their own patterns.

It may be anticipated that consumers using programmable strips of lighting will want to generate a number of different lighting patterns. However, they may not have the skills or technical tools to create dynamic lighting patterns. Alternatively, people may tire of their known lighting patterns.

Currently, animated displays of lighting patterns are generated by software algorithms using branching and interating programming logic. There exists a need to more easily generate dynamic lighting patterns usable with strips or series arrangement of individual lighting elements such as LEDs.

SUMMARY

The disclosed concepts address the above stated situation by providing a novel method in which static or dynamic images may be captured and rendered into a new and unique lighting pattern reproducible on series arrangements of lighting elements, such as a strip of programmable LEDs.

A digital camera or scanning device may be used to capture an image or a frame from a dynamic image. The digitized image is then processed to produce a single dimensional dynamic lighting effect. Each row of pixels of the captured or input image is used to read progressively to determine the color and intensity. Lighting instructions corresponding to each row are then sent to the programmable lighting elements, the latter then being controlled to illuminate and reproduce optical characteristics of a corresponding row of pixels from the input image. The process continues with a first row of pixels from the input image being processed first, followed by processing of a subsequent row of pixels of the input image being processed. Upon processing of the second row of pixels, LEDs of the LED strip are illuminated correspondingly. This process continues iteratively until the final row of pixels of the input image. The lighting display of LEDs is successively illuminated to reflect each row of processed pixels.

If the input image has captured a monochromatic field, then no variation will be reflected in the lighting effect outputted at the LED strip. However, most subjects of image gathering will contain diverse objects. Therefore, each succeeding row of processed pixels will differ from the prior row. Correspondingly, the LEDs illuminated by processing of each row of pixels will vary, thereby generating a dynamic image. Because the output image is one dimensional, it will not be read by the human mind as being part of a real world object or scene, and hence will be perceived as abstract.

The resulting lighting pattern can be varied merely by capturing and processing a new or different object or scene for processing.

Advantages of the novel method include that artists, hobbyists, entertainers, and others may easily design custom animated lighting patterns without knowledge of computer programming. For novices, it would only be necessary to utilize one of many widely available image drawing or capture programs. Also, fractal images may be used to generate lighting patterns without obliging the user to calculate fractal images in real time. Once generated, custom antimated lighting patterns can be copied, moved, traded, and sold by simple downloading or uploading of the image file to a microprocessor used to control a strip of lights, such as a strip of LEDs. Further, a digital camera or scanner may be used to capture input images, thus making it easy for laymen to acquire input images.

BRIEF DESCRIPTION OF THE DRAWINGS

Various objects, features, and attendant advantages of the disclosed concepts will become more fully appreciated as the same becomes better understood when considered in conjunction with the accompanying drawings, in which like reference characters designate the same or similar parts throughout the several views, and wherein.

DETAILED DESCRIPTION

Figure 1:
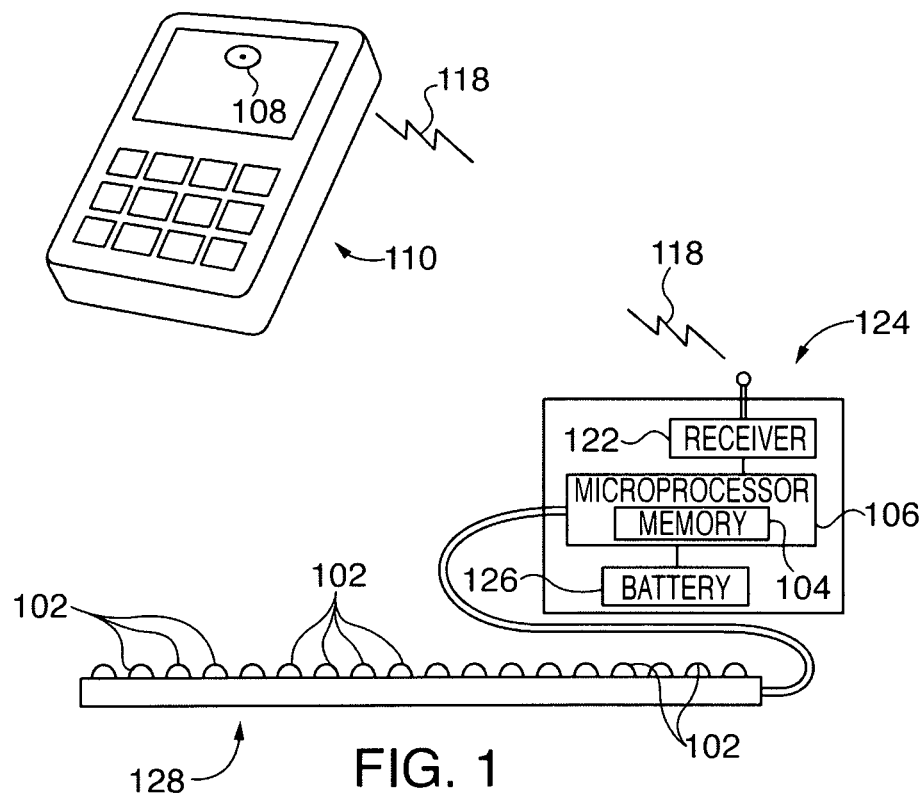
FIG. 1 is a schematic representation of apparatus used in a method of generating a dynamic single dimensional output image from a two dimensional image, according to at least one aspect of the disclosure.
Figure 2:
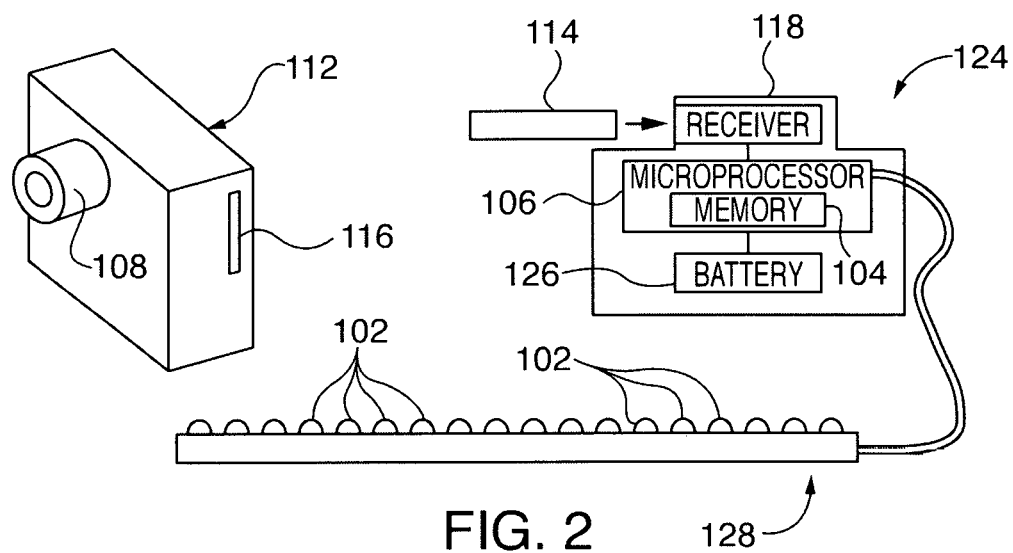
FIG. 2 is a schematic representation of alternative apparatus used in the method of generating a dynamic single dimensional output image from a two dimensional image, according to at least one aspect of the disclosure.
Figure 3:
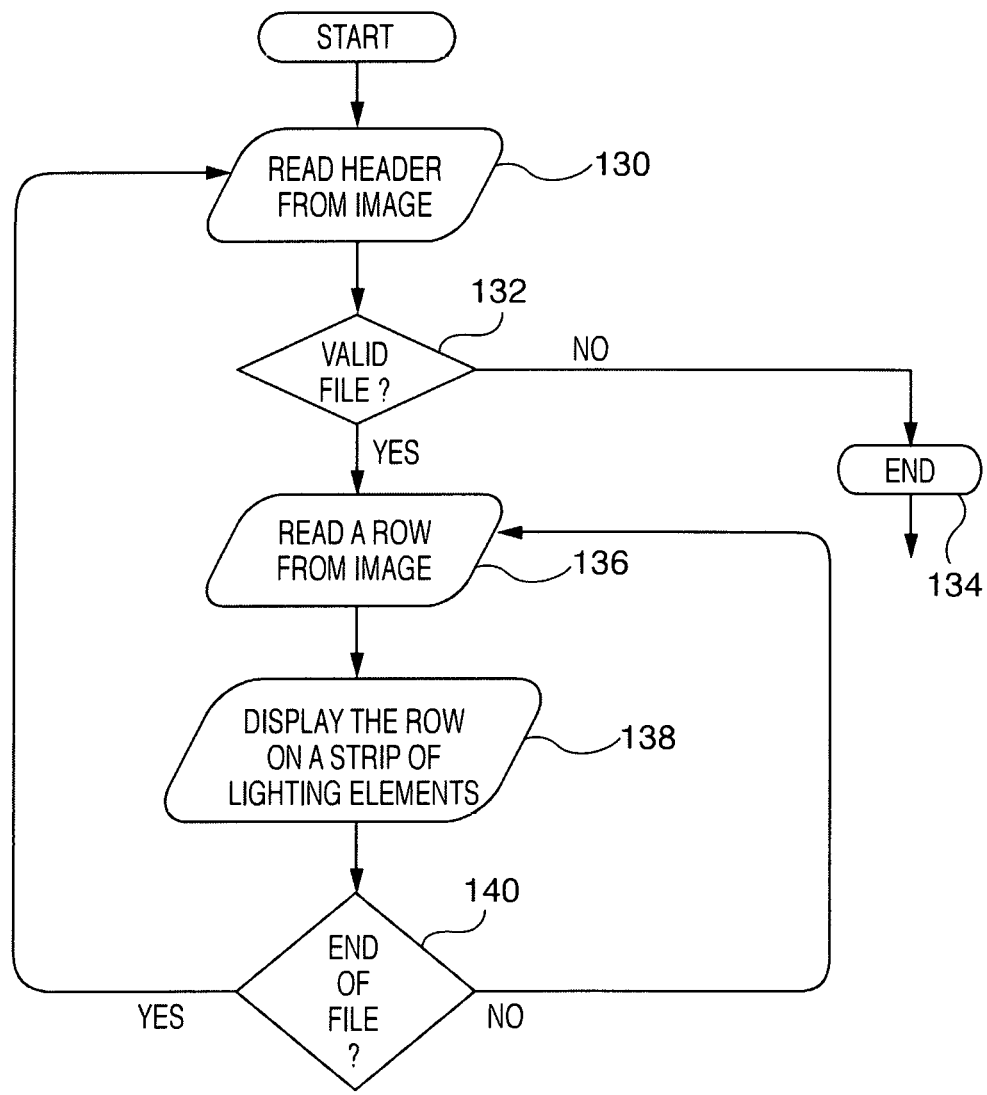
FIG. 3 is a schematic representation showing exemplary handling of data by a data processor in performing the method of generating a dynamic single dimensional output image from a two dimensional image, according to at least one further aspect of the disclosure.

Referring first to FIGS. 1 and 2, according to at least one aspect of the disclosure, there is shown apparatus used in performing a method of generating a dynamic single dimensional output image from a two dimensional image, wherein the output image is to be output on a single dimensional array of individual lighting elements 102. The method may comprise acquiring a digital input image as a plurality of series of pixels, converting a first series of the plurality of series of pixels to first computer instructions in non-transitory form stored in a memory 104 of a data processor 106, and causing at least some of individual lighting elements 102 to illuminate in a color corresponding to a color of a corresponding one of the series of pixels of the digital input image, responsive to the first computer instructions. The method may additionally comprise extinguishing illuminated individual lighting elements, converting a second series of the plurality of series of pixels to second computer instructions in non-transitory form, and causing at least some of individual lighting elements 102 to illuminate in a color corresponding to a color of a corresponding one of the series of pixels of the digital input image, responsive to the second computer instructions. As used herein, "data processor" and "microprocessor" are used interchangeably, unless context dictates otherwise.

The two dimensional image may be for example an image captured by a camera 108 of a smartphone 110 (FIG. 1) or of a digital camera 112 (FIG. 2) producing digitized images containing captured pixels. The first computer instructions may comprise a file, such as a BMP or bitmapped file, although obviously other formats may be employed.

Unless otherwise indicated, the terms "first", "second", etc., are used herein merely as labels, and are not intended to impose ordinal, positional, or hierarchical requirements on the times to which these terms refer. Moreover, reference to, e.g., a "second" item does not either require or preclude the existence of, e.g., a "first" or lower-numbered item, and/or, e.g., a "third" or higher-numbered item.

The two dimensional image may be treated as comprising columns and rows of pixels. In such an example, either columns or rows of pixels may be scanned for or captured to generate the single dimensional output image. Alternatively, a direction of scanning or capturing pixels may be rotated from the column and row format. Rather, scanning or capturing pixels may follow an arbitrary axis superimposed over the original source pixel image.

The single dimensional output image may comprise a linear array of lighting elements 102, such as a flexible light strip (e.g., lighting assembly 128, described hereinafter). It will be appreciated that a flexible light strip may be bent into a two dimensional pattern. However, designation as "single dimensional" refers to a serial arrangement of pixels regardless of whether their host platform is literally straight, or has been bent into a two dimensional array.

In the method, and referring specifically to FIG. 2, converting the first series of the plurality of series of pixels to first computer instructions in non-transitory form comprises downloading a digitized image to portable memory card such as an SD card 114 and establishing communication between SD card 114 and data processor 106. Where a memory card such as SD card 114 is employed, digital camera 112 or another source of digital images (such as a personal computer or other memory based device, not shown) will be understood to have incorporated therein a data port 116 for communicating with the memory card. Similarly, data processor 106 will have a data port 118 for downloading data from the memory card.

Alternatively, in the method, and referring specifically to FIG. 1, converting the first series of the plurality of series of pixels to first computer instructions in non-transitory form may comprise establishing wireless communication with data processor 106 and downloading the pixels into memory 104 of data processor 106. Wireless communication may be via radio frequency signals 118, which may encompass Bluetooth, Wi Fi, and other communication protocols. Where wireless communications are utilized, data processor 106 will be understood to include a suitable radio frequency or other receiver 122.

In the method, converting the second series of the plurality of series of pixels to second computer instructions in non-transitory form may comprise converting a second series of the plurality of series of pixels parallel to the first series of pixels to the second computer instructions in non-transitory form.

In the method, converting the second series of the plurality of series of pixels to second computer instructions in non-transitory form may comprise converting the second series of the plurality of series of pixels adjacent to a preceding said series of pixels of the digital input image into the second computer instructions.

In a representative example of the method, the first series of pixels may correspond to a first row of pixels of the digital input image. This first row may be for example a top row of pixels. As the method proceeds, additional rows of pixels may be used. For example, the second to top row of pixels may furnish the second series of pixels. This process continues, with additional rows of pixels being reproduced on the series of lighting elements 102. If the input image varies from top to bottom, then a lighting pattern responsively produced by lighting elements 102 will vary, and thus be dynamic.

In the method, the first computer instructions and the second computer instructions may cause each illuminated one of the individual lighting elements to be the same color as a corresponding pixel of the digital input image. Lighting elements 102 thereby reflect the colors of the input image, although reproducing the input image line by line will likely distort two dimensional shapes contained in the input image.

In the method, the steps of converting a first series of the plurality of series of pixels to first computer instructions, extinguishing illuminated individual lighting elements, and converting a second series of the plurality of series of pixels to second computer instructions are performed in plural and successive iterations. Again, this generates a dynamic effect if the input image is not constant in form and colors from top to bottom.

In the method, the step of acquiring a digital input image may comprise capturing an image using a mobile communications device (e.g., smartphone 110) having camera 108 incorporated therein, and wirelessly transmitting the captured image to microprocessor 106 to be used to execute the first computer instructions and the second computer instructions. This enables a user to capture an image from the immediate vicinity and exploit that image to generate the dynamic one dimensional image. If not using a device such as smartphone 110 having camera 108 incorporated, data transmission may utilize Bluetooth, Wi Fi, or other protocols.

Alternatively, the method may be realized as a downloadable application for smartphones (e.g., smartphone 110). The method may further comprise downloading supervisory computer instructions into the data processor and permanently storing the supervisory computer instructions in memory 104 of the data processor 106, acquiring a digitized two dimensional image, and downloading the digitized two dimensional image as a file in memory 104 of data processor 106.

In FIGS. 1 and 2, microprocessor 106 and its memory 104 are shown as part of a unitary controller 124. This may be a manufacturing convenience to enable attachment of a single component to lighting elements 102. Of course, microprocessor 106, an associated battery 126, and either receiver 122 or alternatively, data port 118 may be separated and/or remote from one another.

Lighting elements 102 may be light emitting diodes (LEDs) which are part of a lighting assembly 128, such as an LED strip product available from Adafruit Industries, such as NeoPixel digital RGB LED strip, product identification 1461 (https://www.adafruit.com/products/1461). In lighting assembly 128, lighting elements 102 are individually controllable by controller 124.

Controller 124 may comprise an electrical microprocessor made for example by Arduino or may be a Raspberry Pi. Arduino is an open-source electronics platform based on easy-to-use hardware and software. Arduino is a commercial entity which intends its products for use by those creating projects having interactive features. Commercially available programming products of Arduino may be found online for example at a retailer such as Adafruit Industries (https://www.adafruit.com/products/191). Arduino product Mega 2560 R3 (Atmega 2560, assembled), product number 191, has proved satisfactory in the role of controller 124.

It should be understood that the various examples of the apparatus(es) disclosed herein may include any of the components, features, and functionalities of any of the other examples of the apparatus(es) disclosed herein in any feasible combination, and all of such possibilities are intended to be within the spirit and scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

We claim:

1. A method of generating a dynamic single dimensional output image from a two dimensional image, wherein the output image is to be output on a single dimensional array of individual lighting elements, the method comprising: acquiring a digital input image as a plurality of series of pixels; converting a first series of the plurality of series of pixels to first computer instructions in non-transitory form stored in a memory of a data processor; causing at least some of the individual lighting elements to illuminate in a color corresponding to a color of a corresponding one of the series of pixels of the digital input image, responsive to the first computer instructions; extinguishing illuminated individual lighting elements; converting a second series of the plurality of series of pixels to second computer instructions in non-transitory form; and causing at least some of the individual lighting elements to illuminate in a color corresponding to a color of a corresponding one of the series of pixels of the digital input image, responsive to the second computer instructions, such that each succeeding row of processed pixels will differ from the prior row, the individual lighting elements illuminated by processing of each row of pixels will vary, thereby generating the dynamic single dimensional output image.

2. The method of claim 1, wherein converting the first series of the plurality of series of pixels to first computer instructions in non-transitory form comprises downloading a digitized image to a Secure Digital (SD) card and establishing communication between the SD card and the data processor.

3. The method of claim 1, wherein converting the first series of the plurality of series of pixels to first computer instructions in non-transitory form comprises establishing wireless communication with the data processor and downloading the pixels into the memory of the data processor.

4. The method of claim 1, wherein converting the second series of the plurality of series of pixels to second computer instructions in non-transitory form comprises converting a second series of the plurality of series of pixels parallel to the first series of pixels to the second computer instructions in non-transitory form.

5. The method of claim 1, wherein converting the second series of the plurality of series of pixels to second computer instructions in non-transitory form comprises converting the second series of the plurality of series of pixels adjacent to a preceding said series of pixels of the digital input image into the second computer instructions.

6. The method of claim 1, wherein the first computer instructions and the second computer instructions cause each illuminated one of the individual lighting elements to be the same color as a corresponding pixel of the digital input image.

7. The method of claim 1, wherein the steps of converting a first series of the plurality of series of pixels to first computer instructions, extinguishing illuminated individual lighting elements, and converting a second series of the plurality of series of pixels to second computer instructions are performed in plural and successive iterations.

8. The method of claim 1, wherein the step of acquiring a digital input image comprises capturing an image using a mobile communications device having a camera incorporated therein, and wirelessly transmitting the captured image to a microprocessor to be used to execute the first computer instructions and the second computer instructions.

9. The method of claim 1, wherein the method is realized as a downloadable application for smartphones, the method further comprising:
   downloading supervisory computer instructions into the data processor and permanently storing the supervisory computer instructions in the memory of the data processor;
   acquiring a digitized two dimensional image; and
   downloading the digitized two dimensional image as a file in the memory of the data processor.

* * * * *